July 5, 1932.  E. C. BEVANS  1,865,429

EMASCULATOR

Filed Aug. 24, 1931

Inventor

*Earl C. Bevans*

By *Clarence A. O'Brien*
Attorney

Patented July 5, 1932

1,865,429

UNITED STATES PATENT OFFICE

EARL C. BEVANS, OF MONTICELLO, MISSOURI

EMASCULATOR

Application filed August 24, 1931. Serial No. 559,053.

This invention appertains to new and useful improvements in means for castrating horses, cattle, sheep and other animals without breaking the skin or drawing blood.

The principal object of the invention is to provide an emasculator which when used severs the cord leading to the testicle causing same to shrivel and waste away thus eliminating drawing of blood as a result of skin breakage and the resulting danger of infection from the operation.

Other important objects and advantages of the invention will become apparent to the reader of the following specification.

Figure 1:
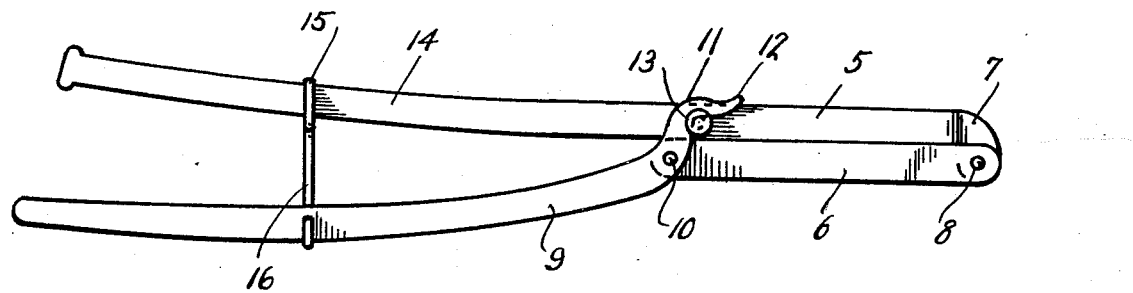
Figure 1 represents a side elevational view of the implement.
Figure 2:
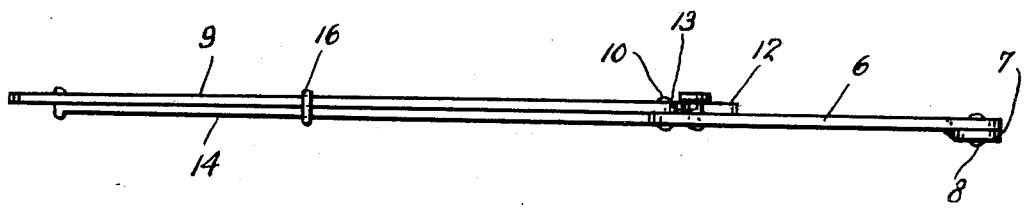
Figure 2 represents a bottom plan view of the implement.

Referring to the drawing wherein like numerals designate like parts, it can be seen that the implement includes a pair of jaws 5 and 6, the jaw 5 being provided with an offset portion 7 extending laterally for its pivotal connection to the jaw 6 as at 8.

Numeral 9 represents an elongated curved lever pivotally connected as at 10 to the inner end of the jaw 6, while the end portion adjacent thereto is provided in the form of a hook 11 having a finger extension 12. This hook 11 is engaged over the stud 13 which projects laterally from the inner end of the jaw 5. The jaw 5 is provided with an elongated slightly curved handle 14 passing through the loop 15 on one end of the hook member 16 which is engageable with the other handle 9.

Manifestly, the organ can be placed between the jaws 5 and 6, after which the hook 11 can be engaged with the stud 13. The handle 9 is now swung toward the handle 14 and engages with the hook 16. This stops all blood circulation in the organ, and the organ can be severed without any likelihood of losing blood or subsequent infection.

While the foregoing specification sets forth the invention in specific terms, it is to be understood that numerous changes in the shape, size and material may be resorted to without departing from the spirit and scope of the invention as claimed hereinafter.

Having thus described my invention, what I claim as new is:

1. A castrating tool of the character described comprising a pair of jaws, said jaws being pivotally connected together at one of their ends, a stud at the remaining end of one of the jaws, a handle extension for the last mentioned jaw, a complementary handle pivotally connected adjacent one end to the remaining end of the other jaw, a hook at the end of the complementary handle adjacent to the pivotal connection, said hook being engageable with the said stud when the jaws are in the act of being contracted.

2. A castrating tool of the character described comprising a pair of jaws, said jaws being pivotally connected together at one of their ends, a stud at the remaining end of one of the jaws, a handle extension for the last mentioned jaw, a complementary handle pivotally connected adjacent one end to the remaining end of the other jaw, a hook at the end of the complementary handle adjacent to the pivotal connection, said hook being engageable with the said stud when the jaws are in the act of being contracted, and a hook extending from one of the handles for engagement with the complementary handle to retain the handles in contracted relation with respect to each other.

In testimony whereof I affix my signature.

EARL C. BEVANS.